(12) United States Patent
Okaji

(10) Patent No.: US 10,648,571 B2
(45) Date of Patent: May 12, 2020

(54) BEARING SEALING DEVICE

(71) Applicant: NTN Corporation, Osaka (JP)

(72) Inventor: Yoshitaka Okaji, Osaka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 16/303,343

(22) PCT Filed: May 17, 2017

(86) PCT No.: PCT/JP2017/018556
§ 371 (c)(1),
(2) Date: Nov. 20, 2018

(87) PCT Pub. No.: WO2017/204058
PCT Pub. Date: Nov. 30, 2017

(65) Prior Publication Data
US 2019/0162312 A1 May 30, 2019

(30) Foreign Application Priority Data
May 24, 2016 (JP) .................. 2016-103239

(51) Int. Cl.
*F16J 15/447* (2006.01)
*F16C 19/06* (2006.01)
(Continued)

(52) U.S. Cl.
CPC ............. *F16J 15/447* (2013.01); *F16C 19/06* (2013.01); *F16C 23/084* (2013.01);
(Continued)

(58) Field of Classification Search
CPC ...... F16C 19/06; F16C 23/084; F16C 33/784; F16C 33/7879; F16C 15/447;
(Continued)

(56) References Cited

U.S. PATENT DOCUMENTS 4,304,412 A * 12/1981 Ladin .................. F16C 33/7853
277/353
4,792,243 A 12/1988 Takeuchi et al.
(Continued)

FOREIGN PATENT DOCUMENTS

| CN | 201705812 U | 1/2011 |
| DE | 3838824 A1 | 5/1990 |

(Continued)

OTHER PUBLICATIONS

IPRP/Written Opinion dated Nov. 27, 2018.
Extended European Search Report dated May 13, 2019.

*Primary Examiner* — Marcus Charles
(74) *Attorney, Agent, or Firm* — Harness, Dickey & Pierce, P.L.C.

(57) ABSTRACT

A bearing sealing device includes two seals (inner and outer seals) sealing the space between the inner and outer races of a bearing to ensure higher seal performance, and also to reduce the area of the inner periphery of the outer race that needs to be ground. The bearing sealing device includes a ring constituted by a metal annulus, and a rubber part. The metal annulus is formed by cold pressing, and has a seal contact surface kept in contact with seal lips of the outer seal. The rubber part includes a press-fitted portion fixed to the inner periphery of the outer race. The inner race has, on its outer periphery, a cylindrical fitting surface to which the outer seal is press-fitted.

7 Claims, 2 Drawing Sheets

(51) Int. Cl.
*F16C 33/78* (2006.01)
*F16C 23/08* (2006.01)
*F16J 15/3236* (2016.01)
*F16J 15/3232* (2016.01)
*F16C 33/80* (2006.01)
*F16C 33/66* (2006.01)

(52) U.S. Cl.
CPC ........ *F16C 33/784* (2013.01); *F16C 33/7896* (2013.01); *F16C 33/805* (2013.01); *F16J 15/3232* (2013.01); *F16J 15/3236* (2013.01); *F16C 33/6618* (2013.01); *F16C 2300/42* (2013.01); *F16C 2310/00* (2013.01)

(58) Field of Classification Search
CPC .............. F16C 33/7889; F16C 33/7896; F16C 33/805; F16C 33/6618; F16C 2300/42; F16C 2310/00; F16J 15/3232; F16J 15/3236
USPC ................ 384/477, 480, 482, 484–486, 490; 277/353, 402, 412, 549
See application file for complete search history.

(56) References Cited

U.S. PATENT DOCUMENTS

| | | | |
|---|---|---|---|
| 5,042,822 A | | 8/1991 | Dreschmann et al. |
| 5,553,870 A | * | 9/1996 | Czekansky ........... B60B 35/121 |
| | | | 277/559 |
| 5,713,579 A | * | 2/1998 | Petrak .................. F16J 15/3264 |
| | | | 277/353 |
| 5,813,675 A | | 9/1998 | Otto |
| 7,927,018 B2 | * | 4/2011 | Heim .................. F16C 33/7879 |
| | | | 384/448 |
| 8,828,178 B2 | * | 9/2014 | Yamamoto ............ F16C 41/007 |
| | | | 156/281 |
| 2004/0086212 A1 | | 5/2004 | Ohtsuki et al. |
| 2011/0019952 A1 | | 1/2011 | Gutowski et al. |
| 2015/0316103 A1 | * | 11/2015 | Inoue .................. F16C 33/7896 |
| | | | 384/484 |

FOREIGN PATENT DOCUMENTS

| | | | | | |
|---|---|---|---|---|---|
| DE | 4312364 | A1 | * | 10/1994 | ............... F16J 15/32 |
| DE | 112013005935 | T5 | | 9/2015 | |
| JP | S62278315 | A | | 12/1987 | |
| JP | 02-093571 | U1 | | 7/1990 | |
| JP | 2001215132 | A | | 8/2001 | |
| JP | 2005264999 | A | | 9/2005 | |
| JP | 2006250240 | A | | 9/2006 | |
| JP | 2006312970 | A | | 11/2006 | |
| JP | 2006349043 | A | | 12/2006 | |
| JP | 2008002487 | A | * | 1/2008 | ............ F16C 33/784 |
| JP | 2008039143 | A | * | 2/2008 | .............. F16C 33/78 |
| JP | 2008175395 | A | | 7/2008 | |
| JP | 2011220513 | A | * | 11/2011 | .............. F16C 33/80 |

\* cited by examiner

BEARING SEALING DEVICE

CROSS REFERENCE TO RELATED APPLICATIONS

This application is a U.S. National Phase Application under 35 U.S.C. 371 of International Application No. PCT/JP2017/018556 filed on May 17, 2017. This application claims priority to Japanese Application No. 2016-103239 filed on May 24, 2016. The entire disclosures of all of the above applications are incorporated herein by reference.

TECHNICAL FIELD

The present invention relates to a bearing sealing device for sealing a rolling bearing.

BACKGROUND ART

General bearing sealing devices include only a single seal, and the seals of two such bearing seal devices are attached to the respective sides of a rolling bearing by fixing the outer peripheral edge of each seal in a seal groove formed in the inner periphery of the outer race of the rolling bearing, with a seal lip or lips of each seal in contact with a seal contact surface formed on the outer periphery of the inner race of the rolling bearing.

Rolling bearings directly exposed to soil, sand and muddy water, such as rolling bearings mounted to agricultural machines use bearing sealing devices each including a first seal fixed to the outer race, and a second seal disposed outwardly of the first seal to prevent the entry of foreign matter. The radially inner portion of the second seal is fixed to the outer periphery of the inner race, and the radially outer portion of the first seal is fixed to the inner periphery of the outer race. By fixing the first and second seals in this way, foreign matter has to move a longer distance until it reaches the interior of the bearings, so that this arrangement ensures higher seal performance.

The below-identified patent document 1 discloses a conventional device sealing a bearing with two seals as described above. This device includes an inner seal fixed in a seal groove of the outer race; an outer seal fixed in a seal groove of the inner race. The inner seal has a plurality of seal lips which are in contact with a cylindrical, seal contact surface formed on the outer periphery of the inner race. The outer seal has also a plurality of seal lips which are in contact with a cylindrical, seal contact surface formed on the inner periphery of the outer race.

PRIOR ART DOCUMENTS

Patent Documents

Patent document 1; US Patent Application Publication No. 2011/0019952

SUMMARY OF THE INVENTION

Problems to be Solved by the Invention

Commonly, seal contact surfaces formed on bearing races are ground so as to ensure seal performance and prevent the wear of seal lips. Since centerless grinding can be used to form cylindrical, seal contact surfaces on the outer peripheries of inner races, such inner races can be easily mass-produced. However, it is often necessary to use a grinding process more difficult than centerless grinding to form cylindrical, seal contact surfaces on the inner peripheries of outer races.

Namely, when an outer race is produced, the portions of the inner periphery of the outer race which need to be ground are the raceway surface on which the rolling elements roll, and seal contact surfaces, which are located outwardly of the raceway surface. Seal grooves are formed between the raceway surface and the respective seal contact surfaces. Therefore, while a special grinding stone is necessary to grind the raceway surface and the seal contact surfaces at the same time, the cost for preparing such a special grinding stone, as well as the load on the grind stone during grinding, are too large. While it is possible to reduce the load on the grinding stone by grinding the raceway surface and the seal contact surfaces (not simultaneously but) separately, ordinary production lines are configured not to grind the inner peripheral portions of outer races other than the raceway surfaces, so that additional costs are necessary to grind the seal contact surfaces.

Also, the cost for forming seal grooves in the outer periphery of an inner race adds to the production cost of the inner race.

In view of the above background, it is an object of the present invention to provide a bearing sealing device which includes two seals sealing the space between the inner race and the outer race of a bearing, and with which it is possible to ensure high seal performance, and reduce the area of the inner periphery of the outer race that needs to be ground.

Means for Solving the Problems

In order to achieve the above object, the present invention provides a bearing sealing device for a bearing including an inner race having a raceway surface on an outer periphery of the inner race, an outer race having an raceway surface on an inner periphery of the outer race, the bearing sealing device comprising: a seal groove in the inner periphery of the outer race; an inner seal including a radially outer portion fixed in the seal groove; and an outer seal including a radially inner portion fixed to the outer periphery of the inner race, and a seal lip; wherein the outer seal is located outwardly of the inner seal, characterized in that the bearing sealing device further comprises a ring having: a press-fitted portion fixed to the inner periphery of the outer race; and a seal contact surface with which the seal lip of the outer seal is in contact.

Since the outer seal is additionally disposed outwardly of the inner seal in the above bearing sealing device, it is possible to ensure higher seal performance, and thus to more reliably prevent foreign matter from entering the bearing. Since the seal contact surface with which the seal lip of the outer seal is kept in contact is formed on the ring formed separately from the outer race, a seal contact surface for the outer seal does not need to be formed on the inner periphery of the outer race. Also, since the ring is fixed, at its press-fitted portion, to the inner periphery of the outer race, it is not necessary to finish, with high accuracy, e.g., by grinding, the portion of the outer race to which the ring is press-fitted. In this way, it is not necessary to form a seal contact surface by grinding the inner periphery of the outer race, and to form a fitting surface for fixing the ring by grinding the inner periphery of the outer race. Therefore, it is possible to reduce the area of the inner periphery of the outer race which needs to be ground.

For example, it is preferable that the ring includes a metal annulus, and a rubber part bonded to an outer periphery of the metal annulus, the press-fitted portion is constituted by a portion of the rubber part, and the seal contact surface is disposed on an inner periphery of the metal annulus. With this arrangement, the metal annulus having the seal contact surface supports the inner periphery of the rubber part, and the press-fitted portion of the rubber part absorbs dimensional errors of an inner peripheral portion of the outer race, thereby making it possible to ensure a uniform fixing force. Therefore, it is possible to easily fix the ring in position by press-fitting the press-fitted portion to a surface formed by turning, which is larger in dimensional error than a surface formed by grinding.

The metal annulus is preferably formed by cold pressing. Since, by forming the metal annulus by cold pressing, the seal contact surface of the metal annulus of the ring comprises a surface formed by cold pressing, the seal contact surface is free of lead traces/marks due to turning, as commonly seen on the inner periphery of the outer race, and also free from adhesion of carbide, which would occur due to heat treatment. Therefore, the seal contact surface is suitable as a surface with which the seal lip comes into contact.

It is preferable that the ring has an inner periphery having an axially outer end portion which is rounded such that a diameter of the axially outer end portion increases axially outwardly of the bearing. If the axially outer end portion is rounded in this way, when the outer seal is disposed between the outer periphery of the inner race and the ring fixed to the outer race, and is fixed to the outer periphery of the inner race, the seal lip is smoothly guided to the seal contact surface by the rounded end portion of the inner periphery of the ring, and thus is not damaged.

It is preferable that the bearing sealing device further comprising a cylindrical fitting surface on the outer periphery of the inner race, the outer seal comprises an annular metal core, and a rubber part bonded to the annular metal core, the seal lip of the outer seal is constituted by a portion of the rubber part of the outer seal, and the radially inner portion of the outer seal comprises a cylindrical surface on an inner periphery of the metal core, the cylindrical surface being fixedly press-fitted to the cylindrical fitting surface of the inner race. With this arrangement, it is possible to fix the outer seal to the outer periphery of the inner race by fitting these cylindrical surfaces made of metal to each other. Therefore, it is possible to make the outer peripheral shape of the inner race simple, and simplify the step of fixing the outer seal.

Grease is sealed in a space between the inner seal and the outer seal. If grease is sealed in the space between the inner and outer seals, due to the lubrication of the seal lip by the grease, and the seal effect of the grease per se, it is possible to ensure high seal performance, and maintain the high seal performance for a long period of time.

It is preferable that the seal lip of the outer seal is one of a plurality of seal lips of the outer seal, and another of the plurality of seal lips is an outermost seal lip located at an outermost position of the bearing among the plurality of seal lips, a labyrinth gap is defined between the outermost seal lip and the inner periphery of the outer race, and a seal lip or seal lips of the plurality of seal lips other than the outermost seal lip are in contact with the seal contact surface of the ring. With this arrangement, due to the seal effect of the labyrinth gap, it is difficult for muddy water outside of the bearing to reach the seal contact surface of the ring.

Effects of the Invention

By use of the above-described bearing sealing device of the present invention, which includes two seals sealing the space between the inner and outer races, it is possible to ensure higher seal performance, and also to reduce the area of the inner periphery of the outer race which needs to be ground.

BEST MODE FOR CARRYING OUT THE INVENTION

Figure 1:
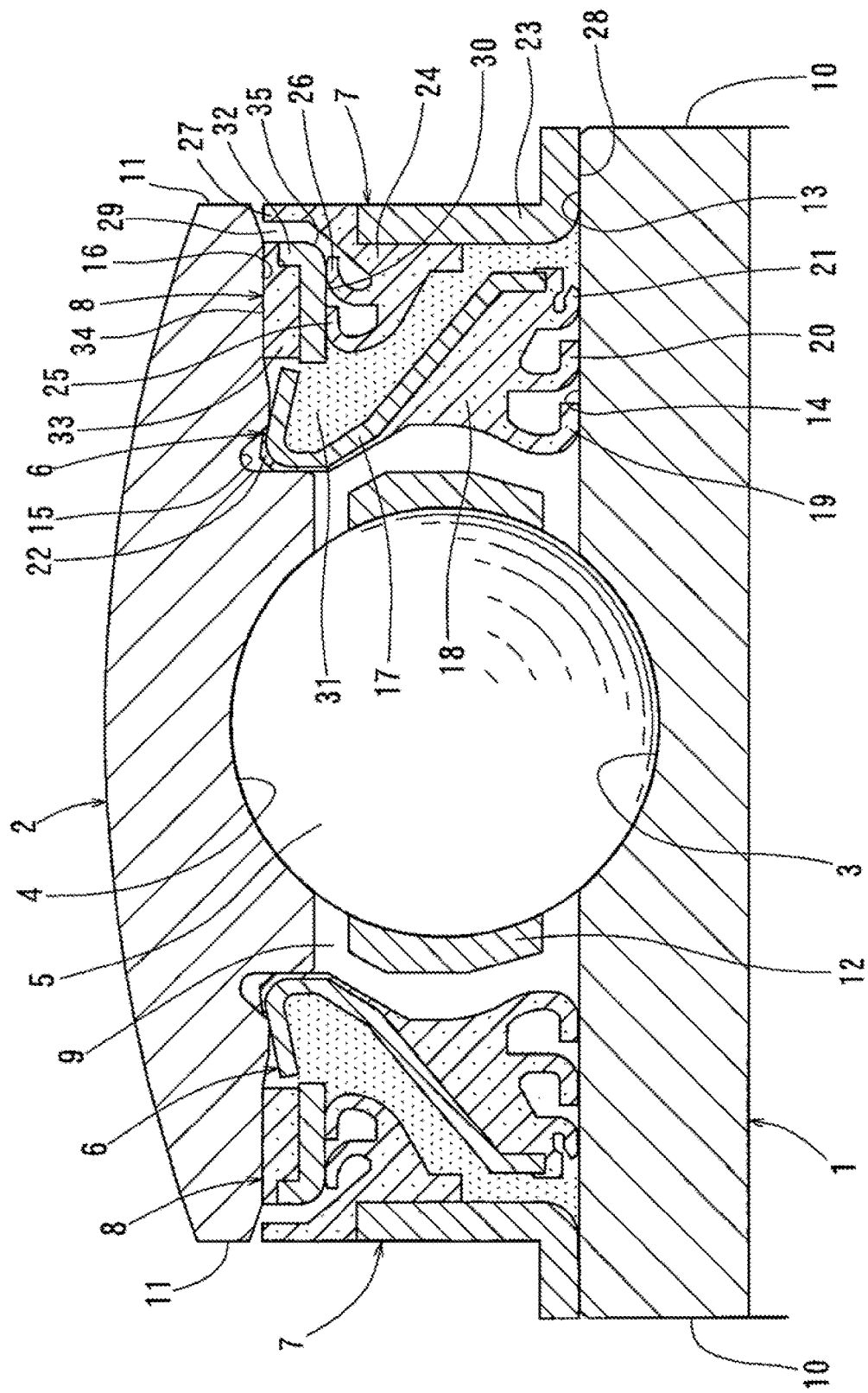
FIG. 1 is a sectional view of a bearing sealing device embodying the present invention.

FIG. 1 shows a sealed bearing including, on each side thereof, a bearing sealing device embodying the present invention. As shown, the sealed bearing includes an inner race 1 comprising an annular member and having an raceway surface 3; an outer race 2 comprising an annular member and having an raceway surface 4; and rolling elements 5 disposed between the raceway surface 3 of the inner race 1 and the raceway surface 4 of the outer race 2. Each bearing sealing device includes an inner seal 6 fixed to the inner periphery of the outer race 2; an outer seal 7 fixed to the outer periphery of the inner racer 1; and a ring 8 fixed to the inner periphery of the outer race 2. Since the bearing sealing devices on the right and left sides of FIG. 1 are identical in structure to each other, and are arranged so as to form mirror images of each other, only the right bearing sealing device is described below, and only the elements of the left bearing sealing device corresponding to those of the right bearing sealing device are indicated by the same reference numerals in FIG. 1.

The inner and outer races 1 and 2 are made of steel, and arranged coaxially with each other (i.e., have a common center axis). An annular, bearing interior space 9 is defined by the outer periphery of the inner race 1 and the inner periphery of the outer race 2.

As used herein, "axial", "axially", and "axial direction" refer to the direction along the common center axis of the inner and outer races 1 and 2; "radial", "radially" and "radial direction" refer to a direction orthogonal to the above common center axis; and "circumferential", "circumferentially" and "circumferential direction" refer to the direction about the above common center axis.

The inner race 1 has two end surfaces 10 defining the width of the inner race 1. The outer race 2 has two end surfaces 11 defining the width of the outer race 2. The width of the inner race 1 is larger than that of the outer race 2.

The rolling elements 5 comprise a predetermined number of balls retained by a retainer 12.

The raceway surface 3 of the inner race 1 comprises a ground surface defining a raceway groove in the outer periphery of the inner race 1. On the right side, the inner race 1 has, on its outer periphery, a cylindrical fitting surface 13, and a cylindrical, seal contact surface 14. A chamfer is formed between the (right) end surface 10 of the inner race 1 and the fitting surface 13. The seal contact surface 14 is formed by grinding, and circumferentially slidable relative to the inner seal 6. The left side of the inner race 1 has the same structure as its right side.

The raceway surface 4 of the outer race 2 comprises a ground surface defining a raceway groove in the inner periphery of the outer race 2. On the right side, the outer race 2 has, on its inner periphery, a seal groove 15; and a cylindrical fitting surface 16 on which the ring 8 is fitted. A chamfers is formed between the (right) end surface 11 of the outer race 2 and the fitting surface 16. The portion of the inner periphery of the outer race 2 located between the raceway groove 4 and the (right) end surface 11, including the fitting surfaces 16, is formed by turning. The left side of the outer race 2 has the same structure as its right side.

The inner seal 6 (of the right bearing seal device) comprises an annular metal core 17; and a rubber part 18 bonded to the metal core 17, and including a plurality of seal lips 19, 20 and 21. The inner seal 6 has a radially outer portion 22 fixed in the seal groove 15 of the outer race 2.

The metal core 17 of the inner seal 6 has the shown sectional shape, and extends continuously over the entire circumference thereof. The metal core 17 is formed by plastically deforming a metal plate by cold pressing.

The rubber part 18 of the inner seal 6 is bonded to the metal core 17 by vulcanization. Each of the seal lips 19, 20 and 21 extends/protrudes like a tongue toward the inner race 1, and is kept in contact with the seal contact surface 14 of the inner race 1 in the radial direction.

The radially outer portion 22 of the inner seal 6 is constituted by the outer periphery of the metal core 17 and the rubber part 18. By plastically deforming the metal core 17 such that the metal core 17 enters the seal groove 15, the radially outer portion 22 is fixedly retained in the seal groove 15.

The outer seal 7 comprises an annular metal core 23 having, on the inner periphery thereof, a radially inner portion 28 comprising a cylindrical surface; and a rubber part 24 bonded to the metal core 23, and including a plurality of seal lips 25, 26 and 27.

The metal core 23 of the outer seal 7 has an L-shaped section, and extends continuously over the entire circumference thereof. The metal core 23 is formed by plastically deforming a metal plate by cold pressing.

The rubber part 24 of the outer seal 7 is bonded to the metal core 23 by vulcanization. Each of the seal lips 25, 26 and 27 extends/protrudes like a tongue toward the outer race 2.

The seal lip 27, which is the outermost seal lip, i.e., located outwardly of the other seal lips 25 and 26 of the outer seal 7, is exposed to the outside of the bearing. A labyrinth gap 29 is defined between the seal lip 27 and the inner periphery of the outer race 2. The labyrinth gap 29 comprises an axial gap portion defined between the ring 8 and the seal lip 27, and a radial gap portion defined between the end surface 11 of the outer race 2 and the seal lip 27.

The seal lips 25 and 26, i.e., the seal lips of the outer seal 7 other than the seal lip 27, are kept in contact with a seal contact surface 30 of the ring 8.

Figure 2:
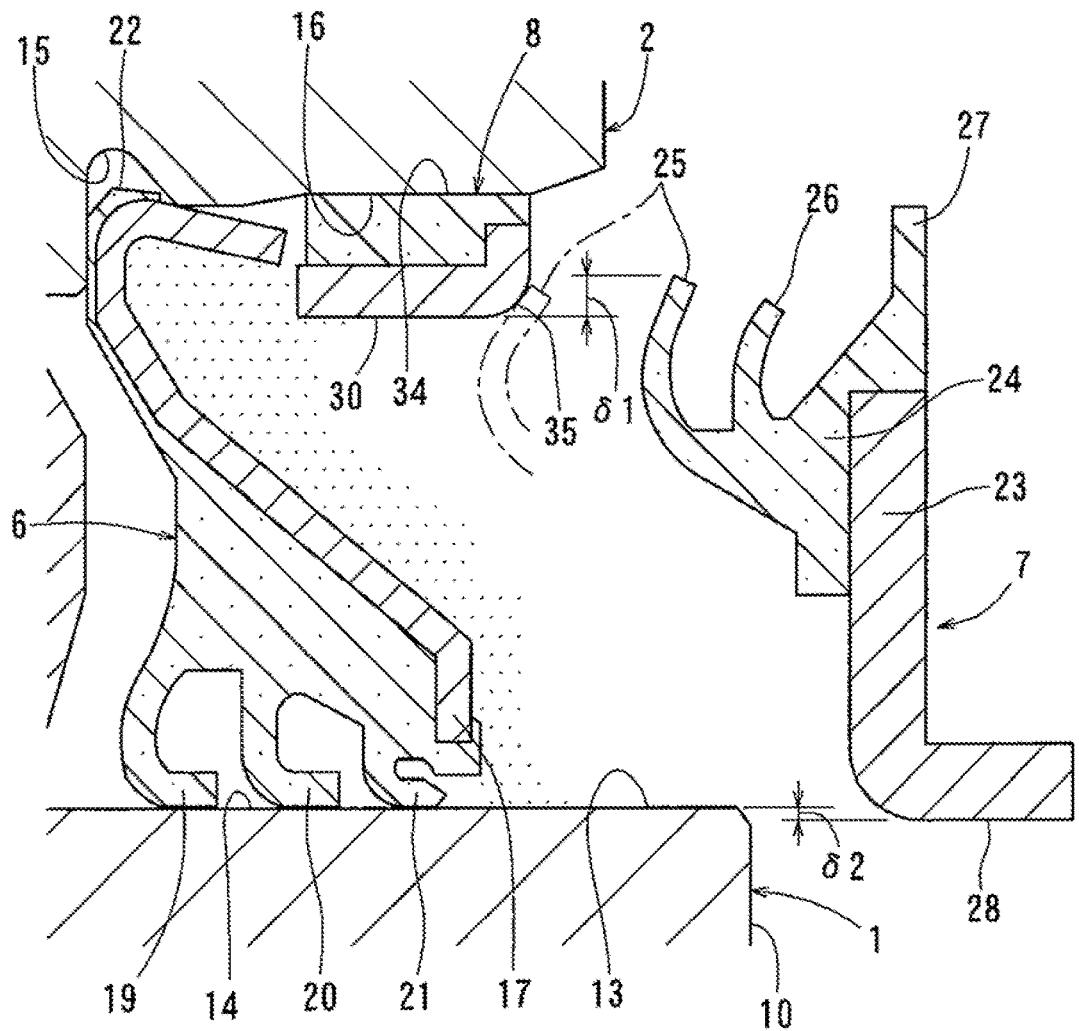
FIG. 2 is a partial sectional view illustrating the bearing sealing device right before the outer seal of FIG. 1 is press-fitted to an inner race.

FIG. 2 illustrates the bearing sealing device right before the outer seal 7 is fixed to the outer periphery of the inner race 1. As shown, the seal lips 25 and 26 are fitted on the seal contact surface 30 with radial interference 61.

As illustrated in FIG. 1, the radially inner portion 28 of the outer seal 7 is fixedly press-fitted to the fitting surface 13 of the inner race 1. As shown, the radially inner portion 28 is fitted on the fitting surface 13 with radial interference 62.

As illustrated in FIG. 1, the outer seal 7 is located outwardly of the inner seal 6, and a gap 31 is defined between the inner seal 6 and the outer seal 7. Grease (indicated by dotted pattern in FIG. 1) is sealed in the gap 31.

The ring 8 comprises a metal annulus 32 having the above-mentioned seal contact surface 30 on the inner periphery thereof; and a rubber part 33 bonded to the outer periphery of the metal annulus 32, and including a press-fitted portion 34.

The axially outer end portion 35 of the inner periphery of the ring 8 is rounded such that its diameter increases axially outwardly of the bearing.

The metal annulus 32 of the ring 8 has the shown sectional shape, and extends continuously over the entire circumference thereof. The metal annulus 32 comprises a flat plate portion extending in the axial direction; and a flange portion bent from the flat plate portion toward the outer race 2. The bent surface of the flange constitutes the end portion 35 of the inner periphery of the ring 8.

The metal annulus 32 is formed by cold pressing, for example, by punching a flat plate so as to remove a circular annular plate portion from the flat plate, and bending the inner peripheral portion of the flat plate portion.

The seal contact surface 30 defines the inner diameter of the metal annulus 32, and is circumferentially slidable relative to the seal lips 25 and 26 of the outer seal 7.

The rubber part 33 of the ring 8 is boned to the outer periphery of the metal annulus 32 by vulcanization. The press-fitted portion 34 is fixed to the fitting surface 16 of the outer race 2. The press-fitted portion 34 has a surface having a diameter larger than the outer diameter of the metal annulus 32, and defining the outer diameter of the ring 8.

Figure 3:
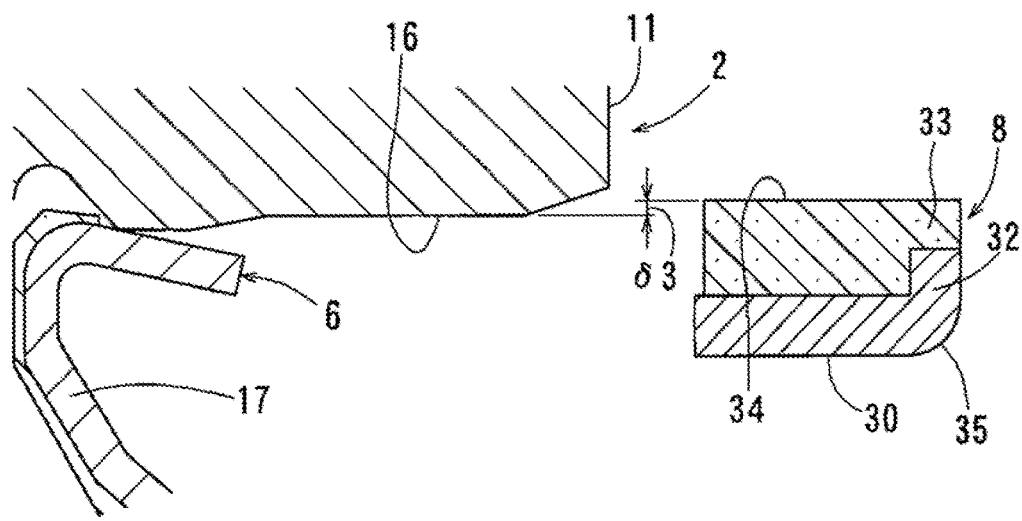
FIG. 3 is a partial sectional view illustrating the bearing sealing device right before the ring of FIG. 1 is press-fitted to the an outer race.

FIG. 3 illustrates the bearing sealing device right before the ring 8 is fixed to the inner periphery of the outer race 2. As shown, the press-fitted portion 34 is fitted on the fitting surface 16 with radial interference 63. Any dimensional error of the radial interference 63 is absorbed by the press-fitted portion 34.

It is now described how the above-described bearing sealing device is assembled. Before assembling the device, the rolling bearing is assembled as illustrated in FIG. 1, that is, the rolling elements 5 are disposed between the inner race 1 and the outer race 2. Among the inner seal 6, the outer seal 7, and the ring 8, the inner seal 6, which needs to be disposed in the innermost portion of the bearing, is first fixed to the outer race 2. More specifically, by deforming the metal core 17 such that the metal core 17 enters the seal groove 15 of the outer race 2, the radially outer portion 22 of the inner seal 6 is crimped to the seal groove 15 of the outer race 2, so that the inner seal 6 is fixed in the seal groove 15 of the outer race 2.

Next, the ring 8 is fixed to the fitting surface 16 of the outer race 2 as illustrated in FIG. 2. More specifically, as illustrated in FIG. 3, the press-fitted portion 34 of the ring 8 is arranged coaxially with the outer race 2, and press-fitted to the fitting surface 16 of the outer race 2. The position of the ring 8 after press-fitting can be determined with reference to the end surface 11 of the outer race 2. The press-fitted portion 34 is preferably press-fitted to the fitting surface 16 with the ring 8 radially compressed by a drawing dish (not shown) until its outer diameter becomes equal to the diameter of the fitting surface 16.

Next, grease is applied. More specifically, in the state of FIG. 2, a predetermined amount of grease (indicated by dotted pattern in FIG. 2) is applied and adhered to the inner seal 6. The grease may be applied to any surface defining the gap 31 (shown in FIG. 1). In the example shown, the grease is applied to the axially outer surface of the metal core 17. This grease applying step may be omitted.

Lastly, the outer seal 7 is fixed to the fitting surface 13 of the inner race 1 as illustrated in FIG. 1. More specifically, in the state of FIG. 2, the radially inner portion 28 of the outer seal 7 is press-fitted to the fitting surface 13 of the inner race 1. The position of the outer seal 7 after press-fitting may be determined such that the end surface of the metal core 23 of the outer seal 7 is radially aligned with the end surface 10 of the inner race 1. By fixing the outer seal 7 in this way, the assembling of the bearing sealing device is completed.

During the step of fixing the outer seal 7 to the inner race 1, the seal lips 25 and 26 of the outer seal 7 come into contact with the end portion 35 of the inner periphery of the ring 8 as indicated by the dashed line in FIG. 2. However, since the end portion 35 is rounded such that its diameter increases axially outwardly of the bearing, the seal lips 25 and 26 smoothly slide, while being deflected, on the end portion 35, and reach the seal contact surface 30.

Since the outer seal 7 is additionally disposed outwardly of the inner seal 6 in the bearing sealing device according to the embodiment of the present invention, it is possible to ensure higher seal performance, and thus to more reliably prevent foreign matter from entering the bearing. Also, since the seal contact surface 30 for the outer seal 7 is formed on the ring 8, i.e., a member other than the outer race 2, it is not necessary to form, on the inner periphery of the outer race 2, a seal contact surface for the outer seal 7. Since the ring 8 is fixed, at its press-fitted portion 34, to the inner periphery of the outer race 2, it is not necessary to finish the fitting surface 16 of the outer race 2 with high accuracy, e.g., by grinding. Since it is not necessary to form, on the inner periphery of the outer race 2, a seal contact surface by grinding, and also to grind the fitting surface 16 for fixing the ring 8, it is possible to reduce the area of the inner periphery of the outer race 2 which needs to be ground. In this way, for the bearing sealing device of the present invention, it is possible to ensure higher seal performance by sealing the space between the inner and outer races 1 and 2 with the dual seal structure, i.e. the inner and outer seals 6 and 7, and also to reduce the area of the inner periphery of the outer race 2 which needs to be ground.

Also, for the bearing sealing device of the present invention, since the inner periphery of the rubber part 33 is supported by the metal annulus 32, which has the seal contact surface 30, and the press-fitted portion 34 is made of rubber, i.e., constituted by a portion of the rubber part 33, the press-fitted portion 34 can absorb any dimensional error of the fitting surface 16 of the outer race 2, which is inevitable if the bearing is one of mass-produced bearings. This ensures a uniform fixing force among mass-produced bearings. Generally speaking, surfaces formed by turning tend to be larger in dimensional error than surfaces formed by grinding. For the bearing sealing device of the present invention, since the seal contact surface 30 can be radially positioned by the metal annulus 32, and the dimensional errors of the fitting surface 16 can be absorbed by the press-fitted portion 34, which is a portion of the thick-walled rubber part 33, it is possible to easily fix the ring 8 in position by press-fitting the press-fitted portion 34 to the fitting surface 16, which is formed by turning.

Also, for the bearing sealing device of the present invention, since the metal annulus 32 of the ring 8 is formed by cold pressing, the seal contact surface 30 of the metal annulus 32 comprises a surface formed by cold pressing. Therefore, the seal contact surface 30 is free of lead traces/marks due to turning, as commonly seen on the inner periphery of the outer race 2, and also free from adhesion of carbide, which would occur due to heat treatment. Namely, the attack of the seal contact surface 30 against the seal lips 25 and 26, which are made of rubber, is less severe, and thus the seal contact surface 30 is suitable as a surface with which the seal lips 25 and 26 come into contact, without finishing the seal contact surface 30 by grinding.

Also, for the bearing sealing device of the present invention, when the outer seal 7 is fixed to the outer periphery of the inner race 1 in the state of FIG. 2, the seal lips 25 and 26 are smoothly guided to the seal contact surface 30 by the rounded end portion 35 of the inner periphery of the ring 8, and thus are not damaged.

Also, for the bearing sealing device of the present invention, since the radially inner portion 28 of the metal core 23 of the outer seal 7 comprises a cylindrical surface fixedly press-fitted to the fitting surface 13 of the inner race 1, it is possible to fix the outer seal 7 to the outer periphery of the inner race 1 by fitting two metal cylindrical surfaces (28 and 13) to each other. As a result thereof, for the bearing sealing device of the present invention, no seal groove is formed in the outer periphery of the inner race 1, and thus the outer peripheral shape of inner race 1 is simple. Consequently, it is possible to fix the outer seal 7 to the inner race 1 by simple press-fitting, i.e., by simply axially pushing in the outer seal 7, and thus to simplify the step of fixing the outer seal 7.

Also, for the bearing sealing device of the present invention, since grease is sealed in the gap 31 between the inner seal 6 and the outer seal 7, due to the lubrication of the seal lips 25 and 26 by the grease, and the seal effect of the grease per se, it is possible to ensure high seal performance, and maintain the high seal performance for a long period of time.

Also, for the bearing sealing device of the present invention, due to the seal effect of the labyrinth gap 29, which is defined between the inner periphery of the outer race 2 and the outermost seal lip 27 of the seal lips 25, 26 and 27 of the outer seal 7, it is difficult for muddy water outside of the bearing to reach the seal contact surface 30 of the ring 8, with which the other seal lips 25 and 26 are in contact.

As described above, the bearing sealing device of the present invention is more excellent than the conventional device disclosed in Patent document 1 in that, while ensuring seal performance equal to or higher than that of the conventional device, and maintaining the seal performance for a long period of time due to the seal effects of the above grease, the labyrinth gap 29, and the inner and outer seals 6 and 7, a seal contact surface does not need to be formed by grinding the inner periphery of the outer race 2; a seal groove does not need to be formed in the outer periphery of the inner race 1; the shape of the metal core of the outer seal to be press-fitted is simple; the outer seal can be easily fixed by press-fitting; and thus costs are low.

The above-described embodiment is a merely example in every respect, and the present invention is not limited to the above embodiment. Therefore, the scope of the present invention is indicated not by the above description but by the claims, and should be understood to include all modifications within the scope of the claims and the meaning equivalent to the scope of the claims.

DESCRIPTION OF REFERENCE NUMERALS

1: inner race
2: outer race
3: raceway surface
4: raceway surface
6: inner seal

7: outer seal
8: ring
13: fitting surface
15: seal groove
16: fitting surface
22: radially outer portion
23: metal core
24: rubber part
25, 26 and 27: seal lip
28: radially inner portion
29: labyrinth gap
30: seal contact surface
31: gap
32: metal annulus
33: rubber part
34: press-fitted portion
35: end portion

The invention claimed is:

1. A bearing sealing device for a bearing including an inner race having a raceway surface on an outer periphery of the inner race, an outer race having an raceway surface on an inner periphery of the outer race, the bearing sealing device comprising:
   a seal groove in the inner periphery of the outer race;
   an inner seal including a radially outer portion fixed in the seal groove;
   an outer seal including a radially inner portion fixed to the outer periphery of the inner race, and a seal lip; and
   a ring having a press-fitted portion fixed to the inner periphery of the outer race, and a seal contact surface with which the seal lip of the outer seal is in contact,
   wherein the outer seal is located outwardly of the inner seal;
   wherein the seal lip of the outer seal is one of a plurality of seal lips of the outer seal, and another of the plurality of seal lips is an outermost seal lip located at an outermost position of the bearing among the plurality of seal lips,
   wherein a labyrinth gap is defined between the outermost seal lip and the inner periphery of the outer race,
   wherein a seal lip or seal lips of the plurality of seal lips other than the outermost seal lip are in contact with the seal contact surface of the ring, and
   wherein the outer race has an end surface, and the labyrinth gap comprises an axial gap portion defined between the ring and the outermost seal lip, and a radial gap portion defined between the end surface of the outer race and the outermost seal lip.

2. The bearing sealing device according to claim 1, wherein the ring includes a metal annulus, and a rubber part bonded to an outer periphery of the metal annulus,
   wherein the press-fitted portion is constituted by a portion of the rubber part, and
   wherein the seal contact surface is disposed on an inner periphery of the metal annulus.

3. The bearing sealing device according to claim 2, wherein the metal annulus is formed by cold pressing.

4. The bearing sealing device according to claim 2, wherein the ring has an inner periphery having an axially outer end portion which is rounded such that a diameter of the axially outer end portion increases axially outwardly of the bearing.

5. The bearing sealing device according to claim 1, wherein the ring has an inner periphery having an axially outer end portion which is rounded such that a diameter of the axially outer end portion increases axially outwardly of the bearing.

6. The bearing sealing device according to claim 1, further comprising a cylindrical fitting surface on the outer periphery of the inner race,
   wherein the outer seal comprises an annular metal core, and a rubber part bonded to the annular metal core,
   wherein the seal lip of the outer seal is constituted by a portion of the rubber part of the outer seal, and
   wherein the radially inner portion of the outer seal comprises a cylindrical surface on an inner periphery of the annular metal core, the cylindrical surface being fixedly press-fitted to the cylindrical fitting surface of the inner race.

7. The bearing sealing device according to claim 1, wherein grease is sealed in a space between the inner seal and the outer seal.

* * * * *